Figure 6:
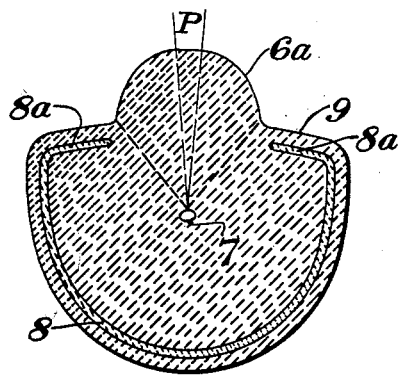

Nov. 14, 1939.  W. M. YOUNG  2,179,773
THERMOMETER
Filed June 21, 1937  2 Sheets-Sheet 1
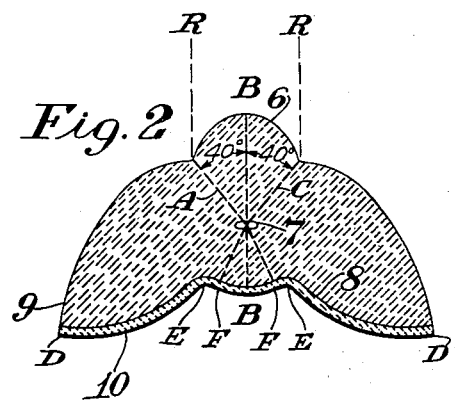
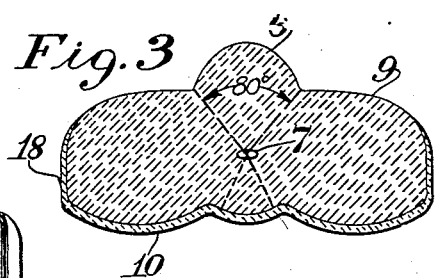
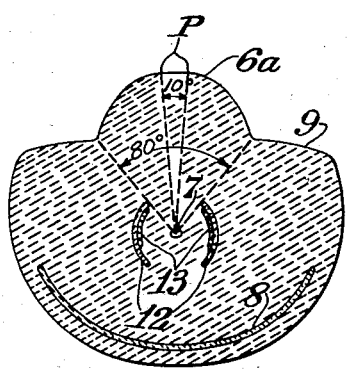
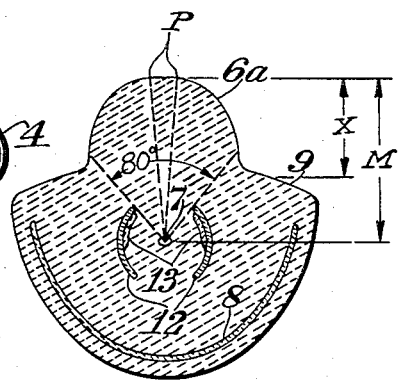
INVENTOR
WILLIAM M. YOUNG
BY D. Clyde Jones
ATTORNEY Nov. 14, 1939.　　　　W. M. YOUNG　　　　2,179,773
THERMOMETER
Filed June 21, 1937　　　2 Sheets-Sheet 2

INVENTOR
WILLIAM M. YOUNG
BY
D. Clyde Jones
ATTORNEY

Patented Nov. 14, 1939

2,179,773

UNITED STATES PATENT OFFICE 2,179,773

THERMOMETER

William M. Young, Rochester, N. Y., assignor to Taylor Instrument Companies, Rochester, N. Y., a corporation of New York Application June 21, 1937, Serial No. 149,294

15 Claims. (Cl. 73—371)

This invention relates to thermometers and more particularly to thermometers of the lens front type.

The reading of a mercury thermometer is complicated by the reflection of light from the bore of the capillary tube forming a part thereof. In the case of thermometers, now in use, this reflection may in some instances be so great that it is almost impossible to locate the mercury column and the thermometer must be turned and twisted in order to eliminate the effect of this undesired reflection. It will be understood that bore reflection is caused by light, which has entered through the scale surface of the glass thermometer tube, and is reflected internally from the capillary bore in such a direction that it is refracted to the eye of the observer. This light is generally white or at least not colored so that the empty bore glitters and closely resembles that portion of the bore which is full of mercury.

If the ordinary mercury thermometer is held directly in front of the observer's face, the mercury in the bore of the tube reflects light which falls upon it at the proper angle, back to the observer's eye. This light originates at the observer's face, which is a low intensity light source and therefore the amount of light reflected from the mercury column for good reading is generally low. However, if the thermometer is tilted in such a way that the mercury reflects light from the sky, the mercury column becomes exceedingly brilliant and it is very difficult to determine the exact end point thereof, particularly if the background is white.

While thermometers have been made with tubes having lens fronts for the purpose of magnifying the column of the indicating liquid, such as mercury, this magnification has also resulted in the exaggeration of the mentioned undesirable factors such as bore reflection and improper illumination of the indicating column which render it difficult to read such thermometers.

Applicant has discovered that in order to enable a mercury thermometer to be read with a high degree of ease, the mercury column should preferably reflect very little light and should appear dark in a bright background rather than as a silver thread on a white background.

It has also been discovered that if the internal lens angle of the thermometer tube, that is, that angle which has its apex at the bore of the tube and subtends the lens of the tube, has a magnitude between 50° and 80°, the possibility of the internal bore reflection will be materially decreased. It has further been discovered that if the rays of light reflected to the observer's eye from the mercury column are limited to those rays entering through the mentioned lens angle, the legibility of the mercury column will be greatly increased, especially if the mercury column is illuminated mainly by light located behind it. It has been found that if the lens portion of the tube is of proper contour the thermometer may be read in many positions with both eyes, that is by binocular vision.

The main feature of the invention relates to the provision of a thermometer incorporating these discoveries and therefore having greatly improved magnification and a greatly increased angle of vision with a substantial reduction in the amount of bore reflection.

The various other features and advantages of the invention will appear from the detailed description and claims when taken with the drawings in which Fig. 1 is a front view of a thermometer typical of the present invention; Figs. 2, 3, 4, 5, 6, 7, 8 and 9 illustrate enlarged cross sections of various tubes suitable for use in the thermometer of Fig. 1.

In Fig. 1 there is illustrated a thermometer comprising a glass capillary tube 5 having a lens portion 6 and provided with a bore 7 extending longitudinally therethrough. The tube is sealed at its upper end and is provided at its lower end with a bulb 4 which communicates with said bore.

The contour of the tube in cross section has an important effect on eliminating bore reflection and on properly illuminating the background of the mercury column for ease in reading the thermometer. In Fig. 2 there is illustrated the cross section of a theoretically developed thermometer tube of which the lens portion 6 thereof is an arc of an ellipse with the bore 7 of the tube located at the rear focus of this ellipse if completely projected. This ellipse preferably has its minor axis and its major axis in the ratio of 1 to 1.312. The elliptical arc of the lens is preferably of such length that lines such as A and C drawn from the edges of said lens to the bore 7 define an angle equal to twice the arccosine of the reciprocal of the index of refraction of the glass of the tube, that is, an angle of approximately 80°. For convenience this angle is referred to as the internal lens angle. While this angle is preferably 80° it may have a value as low as 50° with some lessening of the advantages of the invention. By the use of this relatively wide lens angle, a much greater amount of light reaches the mercury column, and yet bore reflection is reduced to a minimum since only light incident on the bore 7 at an angle greater than 40° to the axis of symmetry B—B of the tube, that is, from the bore to the center of the lens surface, is internally reflected to the observer. It will be understood that reflection from the unfilled portion of the bore of a tube having an elliptical lens section results when any ray of light entering therein in such a manner that it strikes the capillary bore at an angle greater than 40° with respect to the axis of symmetry, is internally reflected within the tube and is refracted to the observer. This would tend to give a certain amount of illumination to the bore even though the mercury had not risen therein and it was for this reason that the angle between the two rays A and C is limited to an internal lens angle of 80°.

In the tube of Fig. 2, the light that falls on the mercury column in the bore 7 is limited to those rays included between the parallel lines or rays R, R. If the thermometer is to be used as a clinical thermometer, these rays incident on the mercury column originate at the face of the observer which is a low intensity light source. The mercury column is thus subjected to low intensity illumination and therefore appears rather dark.

This thermometer is so constructed that very little light can reach the mercury column other than that passing thru the elliptical lens section of the tube.

It will be noted that the frontal surface of the tube has been increased by the provision of a wing 9 at each side of the lens. The curvature of the surfaces of these wings is such that they do not refract light to the bore but do refract light to the background portion of the shield to illuminate it. In addition, the sides of the tubes are so shaped that they refract to the background, light entering the tube at an oblique angle. The lens also serves to direct light to this background. Thus the mercury column appears dark against the bright background when the observer's face is in a close reading position with respect to the thermometer. Bore reflection might also occur due to light entering through the wings 9 of the tube and which is incident on the capillary bore at less than the critical angle. However, the surface of each of the wings between the points D and E has been curved in such a manner that any ray striking this surface at grazing incidence and refracted at the usual angle of 40°, passes below the bore and emerges through the opposite wing 9 at the other side of the tube. With this curved surface of the tube, it is impossible for any ray incident on the surfaces of the wings to reach the bore 7 and then be reflected through the lens section of the tube to the observer. Thus this source of possible bore reflection is reduced to a minimum.

It has been mentioned that the mercury column is frequently illuminated during reading by light from the observer's face which is a low intensity light source. It has been discovered that with the mercury column thus lighted, its legibility will be greatly enhanced if the background of the rear of the mercury column, such as the rear surface 10 of the tube is especially illuminated. The portion of the rear surface of the tube between the characters E—E is provided with a layer of opaque glass or enamel which may be white, yellow, red or some other color, except pale pastel colors. Light falling on this section of the tube generally originates at the observer's face and selective reflection will send back a small percentage of this incident light. The portion of the surface between the characters F—F should preferably be an arc of an ellipse having the same ratio of major to minor axis as that of the lens 6. That portion of the rear surface of the tube between the characters E and D is coated with a white or colored layer and is so positioned that it receives scattered white light incident on the front or scale surface of the wings 9 and reflects this light back to this surface. However, those rays falling on that section of the rear surface of the tube between the characters E and F are refracted through the capillary bore 7 to the front lens surface 6 and are then refracted to the observer. Because of the large area of the front surface of the wings 9, the amount of light falling on the rear section between the characters E and E is large and the rear surface or background of the tube is intensely illuminated. The portions of the rear surface of the tube between the characters E and D may be coated with a colored glass or enamel to provide a colored background for a graduated scale etched or engraved on the front surfaces of each of the wings 9 so that these scales are highly illuminated.

In many designs of thermometers now in use, light entering the tube and incident on the edges of the flattened bore, and also light from the background, falls on the mercury column where it is reflected to the observer in such a way that it greatly decreases the apparent width of this column. This undesirable condition has been avoided in the thermometer tube of Fig. 2, by reason of the fact that the sections between E and D of the rear surface of the tube are so shaped that any light rays incident thereon from the front surfaces of the wings 9, do not reach the bore 7.

The theoretical tube illustrated in Fig. 2 presents some manufacturing difficulty in maintaining the exact contour indicated. However, in Fig. 3 there is illustrated in cross section, a thermometer tube which possesses substantially all of the advantages derived by the tube construction of Fig. 2 and yet is comparatively easy to manufacture. In this tube the wings 9 are generally flat and the sides of the tube form a light shield 18 of dark colored enamel or translucent material. This shielding, as well as the scale surface of the wings 9 is such that it is impossible for any ray of light other than that entering through the lens section 6 from being reflected from the mercury column back to the observer.

Thermometers now in common use when viewed in a vertical position are most easily read by use of one eye only. This arises from the fact that the lens fronts of the thermometer tubes are of such contour as not to permit binocular vision. In the modified arrangement shown in Fig. 4, the lens section 6a, while it has an internal lens angle of 80°, has a contour such as to enable the thermometer to be read by binocular vision. This contour is not that of an arc of a true ellipse but may be likened to an arc of an ellipse that has been split into two sections which are connected by a flat surface of a prismatic section P having an internal angle of approximately 10° inserted therein. With this novel type of lens the thermometer is easily read by binocular vision. In this modified form of tube, the background of the bore includes the light shield 8 substantially coextensive with the rear surface of the tube. However, additional opaque light shields 12 are positioned in the glass adjacent to and at either side of the bore of the tube. The front edges of these shields are so positioned that they extend approximately to the boundaries of the mentioned internal lens angle. The inner surfaces of these shields preferably include dark layers 13. This shielding produces a darkening effect on the mercury column and prevents white light from impinging on the sides of the mercury column at such an angle that it would be reflected to the observer and thereby tend to restrict the width of the image of the mercury column.

The modified form of thermometer tube illustrated in cross section in Fig. 5 differs from that illustrated in Fig. 4 in the relative location of scale surfaces on the front of the wings 9 from the front of the lens. The scale surface of the wings 9 are located a distance X from the front of the lens, while the bore 7 is located a distance M from this lens front. If these distances are so chosen that $$\frac{M}{X}$$

equals the index of refraction of the glass, then the apparent position of the image of the bore will be approximately in the plane of the scale surface. In this manner parallax between the scale and the image of the mercury column is eliminated. It will be appreciated that by elimination of parallax there will be a considerable minimizing of errors in reading which usually result from the use of etched stem thermometers.

The modified thermometer shown in Fig. 6 differs from the thermometer tube of Fig. 4, in that the shields 12 adjacent the bore have been omitted and the shield 8 has been extended so that parts 8a thereof underly the etched scales on the wing sections 9 of the tube.

Figure 7:
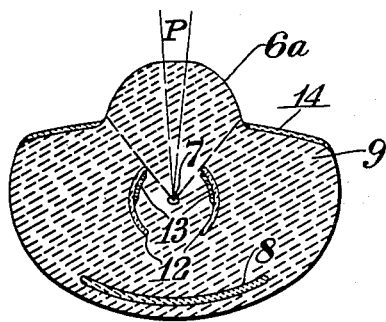

In Fig. 7 there is shown a modified type of tube which is similar to that illustrated in Figs. 4 and 5, but differs therefrom in that the scale surfaces of the wings 9 are coated with a shield layer 14 through which the graduations may be etched.

Figure 8:
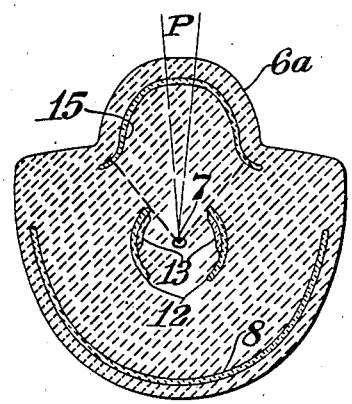

The modified tube illustrated in Fig. 8 is similar to that illustrated in Fig. 4, but differs therefrom in that a thin transparent strip of colored glass 15 is positioned just beneath the surface of the lens 6a but does not enclose the bore 7. The color of this strip of glass is preferably green or blue, or some color complementary to red. The use of such a color strip between the front surface of the lens and the bore of the tube causes the mercury column to have a darkened appearance and makes the background above the bore appear to be colored. It should be noted that in the construction of Fig. 8 it is only necessary for light projected from the light background 8 to pass through the empty bore 7 and then be transmitted to the observer through the single layer of colored glass 15.

Figure 9:
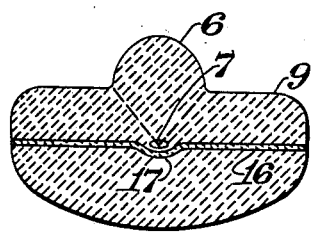

In Fig. 9 there is illustrated a cross section of a thermometer tube embodying the principles illustrated in Fig. 3. In this tube the lens section 6 may be identical with the lens section of Fig. 3, or may be of the contour illustrated in Fig. 4 to afford easy binocular reading. In this tube a light shield extends from one edge of the tube to the other. This shield has a depression 17 therein so that this portion of the shield substantially encloses the rear surface and the edges of the bore 7. The shield 16 may be of translucent material so that the mercury column can be read preferably by light transmitted through the shielding.

From the foregoing it will be understood that the present invention provides a thermometer in which the visibility of the mercury column has been greatly improved due to the fact that this column is properly illuminated and due to the fact that bore reflection is reduced to a minimum.

I claim:

1. A thermometer tube having a bore extending longitudinally therethrough, said tube being shaped to have a cylindrical lens front defined by an arcuate surface, the cross-section of which is an arc of an ellipse, having its major axis coinciding with the axis of symmetry of the tube, said tube having its bore located substantially at the focal line of the lens with the extreme edge rays passing through the lens forming an angle of not less than 50° nor more than 80° at the axis of the bore.

2. A thermometer comprising a tube having a bore extending longitudinally therethrough, a bulb communicating with said bore, and an indicating liquid in said bulb and a portion of said bore, said tube being shaped to have a cylindrical lens front defined by an arcuate surface, the cross section of which is an arc of an ellipse having its major axis coinciding with the axis of symmetry of the tube, said tube having its bore located substantially at the focal line of the lens with the extreme edge rays passing through the lens forming an angle of not less than 50° nor more than 80° at the axis of the bore.

3. A thermometer tube having a bore extending longitudinally therethrough, said tube being shaped to have a cylindrical lens front defined by an arcuate surface, the cross-section of which is an arc of an ellipse, having a ratio of minor to major axis of the order of 1 to 1.312 and having its major axis coinciding with the axis of symmetry of the tube, said tube having its bore located substantially at the focal line of the lens with the extreme edge rays passing through the lens forming an angle of not less than 50° nor more than 80° at the axis of the bore.

4. A thermometer tube having a bore extending longitudinally therethrough, said tube being shaped to have a cylindrical lens front defined by an arcuate surface, the cross section of which is an arc of an ellipse having its major axis coinciding with the axis of symmetry of the tube, said tube having its bore located substantially at the focal line of the lens with the extreme edge rays passing through the lens forming an angle of not less than 50° nor more than 80° at the axis of the bore, and means comprising a part of said tube for limiting light rays reflected from the indicating liquid to the observer, to those entering the tube through said lens.

5. A thermometer comprising a tube having a bore extending longitudinally therethrough, a bulb communicating with said bore, and an indicating liquid in said bulb and a portion of said bore, said tube being shaped to have a cylindrical lens front defined by an arcuate surface, the cross section of which is an arc of an ellipse having its major axis coinciding with the axis of symmetry of the tube, said tube having its bore located substantially at the focal line of the lens with the extreme edge rays passing through the lens forming an angle of not less than 50° nor more than 80° at the axis of the bore, and means comprising a part of said tube for limiting light rays reflected from the indicating liquid to the observer, to those entering the tube through said lens.

6. A thermometer tube having a bore extending longitudinally therethrough, said tube being shaped to have a cylindrical lens front defined by an arcuate surface, the cross section of which is an arc of an ellipse having its major axis coinciding with the axis of symmetry of the tube, said tube having its bore located substantially at the focal line of the lens with the extreme edge rays passing through the lens forming an angle of not less than 50° nor more than 80° at the axis of the bore, and light shielding means forming a part of said tube and substantially limiting the illumination of said bore to light passing through said lens front.

7. A thermometer tube having a capillary bore extending therethrough, said tube having a cylindrical lens front with an arcuate surface of a cross section defined by symmetrical elliptical arcs of equal length joined by an approximately straight line, said bore being located at the focal line of the lens with the extreme rays passing through the lens forming an angle at the axis of the bore of not less than 50° nor more than 80°.

8. A thermometer tube having a bore extending longitudinally therethrough, said tube being shaped to have a cylindrical lens front defined by an arcuate surface, the cross section of which comprises two arcs of an ellipse joined by a substantially straight line, the major axis of said elliptical arcs extending in the general direction of the axis of symmetry of the tube, said tube having its bore located substantially at the focal line of the lens with the extreme edge rays passing through the lens forming an angle of not less than 50° nor more than 80° at the axis of the bore, said straight line being subtended by an angle having its apex at said bore and measuring approximately 10°.

9. A thermometer tube having a bore extending longitudinally therethrough, said tube being shaped to have a cylindrical lens front defined by an arcuate surface, the cross section of which comprises two arcs of an ellipse joined by a substantially straight line, said ellipse having a ratio of minor to major axis of the order of 1 to 1.312, the major axis of said elliptical arcs extending in the general direction of the axis of symmetry of the tube, said tube having its bore located substantially at the focal line of the lens with the extreme edge rays passing through the lens forming an angle of not less than 50° nor more than 80° at the axis of the bore, said straight line being subtended by an angle having its apex at said bore and measuring approximately 10°.

10. A thermometer tube having a capillary bore extending longitudinally therethrough, said tube being shaped to have a cylindrical lens front with an arcuate surface, the cross section of which is an arc of an ellipse having its major axis coinciding with the axis of symmetry of said tube, said bore being located at the focal line of the lens with the extreme edge rays passing through the lens forming an angle of not less than 50° nor more than 80° at the axis of the bore, a light shield at the rear portion of said tube with respect to the reading face thereof, bore shields at each side of and adjacent to said bore in the space at the rear of said angle, said bore shields extending in directions generally parallel to the axis of symmetry of said lens and having portions thereof adjacent said bore formed of dark material.

11. A thermometer tube having a bore extending longitudinaly therethrough, said tube being shaped to have a cylindrical lens front generally defined, in cross section, by the arc of an ellipse and having its bore located substantially at the rear focus of said ellipse and at substantially the focal line of said lens, the arc defining said lens being of such length that lines drawn from the edges of said lens to said bore define an angle of not less than 50° nor more than 80°, the axis of symmetry of said tube bisecting said arc and coinciding with the major axis of said ellipse.

12. A thermometer comprising a tube having a bore extending longitudinally therethrough, a bulb communicating with said bore and an indicating liquid in said bulb and a portion of said bore, said tube being shaped to have a cylindrical lens front generally defined, in cross section, by the arc of an ellipse and having its bore located substantially at the rear focus of said ellipse and at substantially the focal line of said lens, the arc defining said lens being of such length that lines drawn from the edges of said lens to said bore define an angle of not less than 50° nor more than 80°, the axis of symmetry of said tube bisecting said arc and coinciding with the major axis of said ellipse.

13. A thermometer tube having a bore extending longitudinally therethrough, said tube being shaped to have a cylindrical lens front defined by an arcuate surface, the cross-section of which includes an arc of an ellipse, having its major axis coinciding with the axis of symmetry of the tube, said tube having its bore located substantially at the focal line of the lens with the extreme edge rays passing through the lens forming an angle of not less than 50° nor more than 80° at the axis of the bore.

14. A thermometer tube having a capillary bore extending therethrough, said tube being shaped to have a cylindrical lens front defined by an arcuate surface and to have at least one wing provided with a scale surface to receive graduations thereon, the cross section of which arcuate surface includes an arc of an ellipse having its major axis coinciding with the axis of symmetry of said tube, said bore being located at the focal line of the lens with the extreme edge rays passing through the lens forming an angle of not less than 50° nor more than 80° at the axis of the bore, the mentioned scale surface of said wing being located approximately in a plane normal to the axis of symmetry of said tube and approximately intersecting the image of said bore.

15. A thermometer tube having a capillary bore extending therethrough, said tube being shaped to have a cylindrical lens front defined by an arcuate surface and to have at each side of said lens front a wing provided with a scale surface adapted to receive graduations thereon, the cross section of which arcuate surface includes an arc of an ellipse having its major axis coinciding with the axis of symmetry of said tube, said bore being located at the focal line of the lens with the extreme edge rays passing through the lens forming an angle of not less than 50° nor more than 80° at the axis of the bore, the mentioned scale surface of said wing being located approximately in a plane normal to the axis of symmetry of said tube and approximately intersecting the image of said bore.

WILLIAM M. YOUNG.